Nov. 4, 1941.    J. W. BROWN, JR    2,261,136
HEAT EXCHANGE CONDUCTOR
Filed Nov. 14, 1938
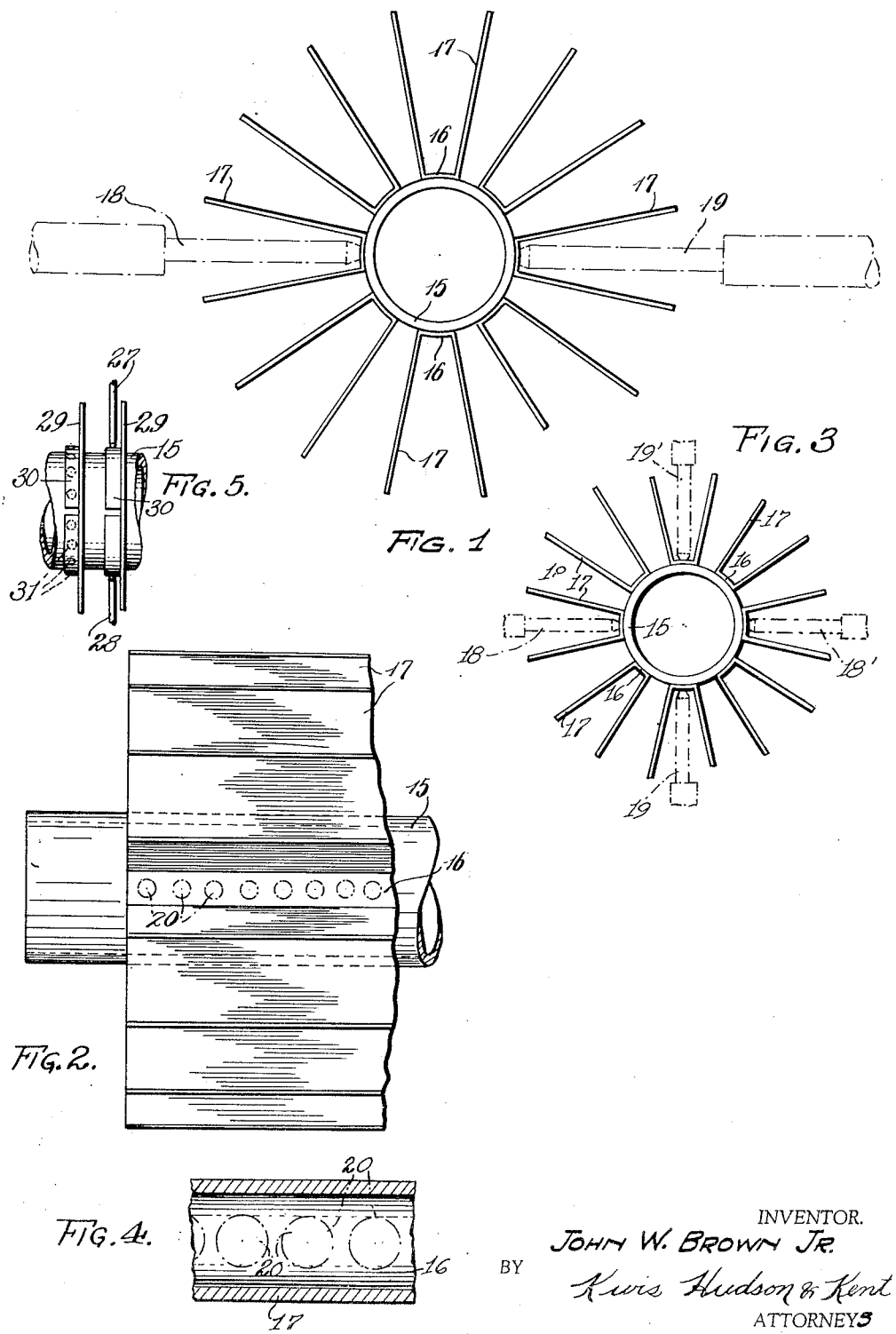
INVENTOR.
JOHN W. BROWN JR.
BY
Kwis Hudson & Kent
ATTORNEYS Patented Nov. 4, 1941

2,261,136

UNITED STATES PATENT OFFICE 2,261,136

HEAT EXCHANGE CONDUCTOR

John W. Brown, Jr., Lakewood, Ohio, assignor to Brown Fintube Company, Elyria, Ohio, a corporation of Ohio Application November 14, 1938, Serial No. 240,328

2 Claims. (Cl. 257—262)

This invention relates to improvements in heat exchange conductors, and has reference particularly to the formation of welds electrically for uniting fins to pipes, with reference especially to producing a path for heat travel from a pipe to the fins or vice versa which shall offer a minimum of resistance.

One of the objects of the invention is the formation of welds between a pipe and metal articles to be attached thereto without resorting to the use of a welding electrode inside the pipe.

Another object of the invention is the provision of a new method of forming two rows of spot welds or other resistance welds simultaneously between a pipe and heat exchange fins by the use merely of a single pair of welding electrodes.

Another object is the provision of heat exchange conductors having channel shaped fins attached thereto by welds so proportioned and arranged as to offer no material resistance to the flow of heat from the conductor to the two flanges of the channel.

Other objects and features of novelty will appear as I proceed with the description of those embodiments of the invention which, for the purposes of the present application, I have illustrated in the accompanying drawing, in which—

Fig. 1 is an end view illustrating the welding of the last two of a series of channel shaped heat exchange fin members to a tubular conductor.

Fig. 2 is a fragmental elevational side view of a conductor with channel shaped fin members spot welded thereto in accordance with the disclosure of Fig. 1.

Fig. 3 is a view similar to Fig. 1 illustrating a modification in the apparatus employed.

Fig. 4 is a large scale sectional view showing a series of spot welds formed as illustrated in Figs. 1, 2 and 3.

Fig. 5 is a fragmental elevational view illustrating the application of the invention to fins extending around the pipe rather than longitudinally thereof.

The invention has to do with tubular conductors which are provided with heat exchange extensions in the form of fins. The latter may be longitudinal, which is the preferred form of the present invention, or they may be transversely arranged annular fins, or they may have some intermediate arrangement as for example a spiral arrangement, not herein shown. In all cases the fins are joined to the pipe by welds the area and perimetral lengths of which are so selected as to provide paths for heat from the pipe to the flanges of the channel which shall be at least as free and unobstructed as the paths through the flanges themselves.

Referring first to Figs. 1 to 4 inclusive, 15 indicates a tubular metal conductor, for example a cold drawn annealed steel tube or pipe, which may be employed as a conductor in a refrigerating system or other heat exchange apparatus. The diameter and length of this tubular member may be varied of course to suit different conditions and purposes.

The heat dissipating or absorbing surface of the pipe 15 is greatly increased by mounting upon it, preferably at evenly spaced points circumferentially of the pipe, a series of channel fin members having base or web portions 16 that conform substantially to the outer surface of the pipe, and flanges 17 that extend outwardly from the web. As shown herein they extend radially with respect to the pipe, but other arrangements of the flanges are contemplated also.

My new method of uniting these fin members with the pipe consists in electrically welding them at least two at a time to the pipe by the use of a single pair of electrodes. As illustrated in Fig. 1, two of the channel fin members 16, 17 are brought into juxtaposition with the pipe and held there by a suitable jig. Then spot welding electrodes 18 and 19 on opposite sides of the pipe and in exact alignment are brought into engagement with the webs 16 of the two channel members and caused to exert pressure inwardly, after which the welding current of properly selected current density is turned on for a predetermined short interval of time to effect two spot welds at diametrically opposite points of the pipe. The current traverses the pipe but does not materially heat the pipe except at the points of the weld. This evidently is due to the fact that the current path through the pipe is very large indeed as compared with the size of its path as it enters and leaves the pipe. After one pair of such welds has been made the electrodes are caused to move along in the direction of the length of the pipe, or the electrodes remain relatively fixed and the pipe is caused to move along. The movement is of a predetermined extent to properly space the welds. A second set of spots are then welded and the procedure is continued in this way until the whole length of the channel member is united with the pipe by welds of uniform size, evenly spaced. In Figs. 2 and 4 these spots are numbered 20. They must be of such size that their combined area will afford as large a path for heat travel from the pipe as will be afforded by the cross sectional area of the two flanges 17 taken together. The imaginary disks of metal in the web 16 defined by the spots 20 must also be able to pass heat through the web to the flanges 17 as readily as the heat can flow through the flanges themselves. The area of the edge or perimeter of each of these imaginary disks is equal to the circumference of the disk times its height, the latter being the thickness of the metal. The combined cross sectional area of the two flanges 17 equals twice the length of the channel times the thickness of the metal. The thickness of the web and flanges is the same however, so that this factor in each case may be omitted, and hence the circumference of all of the spots taken together must equal twice the length of the channel. It is then necessary to select electrodes with points or ends of such size as to give the proper total area to the spots, and to so space the spots that their combined circumference will be equal in length to twice the length of the channel member.

In Fig. 3 I have illustrated a modification wherein four spots are welded simultaneously by the use of two pairs of electrodes 18, 19 and 18', 19'. The procedure of welding is the same, but of course fewer passes are necessary, and the path of the current through the pipe is shorter than in the case of Fig. 1.

When transverse fins are to be used they may be applied to the pipe by welding two spots at a time at diametrically opposite points just as in the case of the longitudinal fin members. I have illustrated such a case in Fig. 5 where a short section of pipe is shown provided with two such fins, one of which is in the process of being united with the pipe by a pair of electrodes 27 and 28. These fins consist of annular members 29 that are flat except for short cylindrical hub portions 30. The spot welds are indicated at 31 in Fig. 5. They are proportioned and spaced in the same manner as previously described for the longitudinal fin members, but in this instance their size and number may be less since there is but one flange for dissipating or absorbing heat that must pass through the welds. It will be appreciated that a long thin strip with a base portion similar to the hub 30 could be wound spirally upon a pipe, or two or three such strips could be used so as to make a double or triple thread spiral, and the same method could be employed for uniting such strip or strips with pipe by two spot welds at a time or by two simultaneously formed continuous welds.

Reference is hereby made to my copending application Serial No. 380,690 filed February 26, 1941, which contains related subject matter, to my copending application Serial No. 323,593 filed March 12, 1940, which relates to a suitable apparatus for welding fins to tubes, and to my copending application Serial No. 388,835 filed April 16, 1941, which relates to methods of making finned tube heat exchange conductors.

Having thus described my invention, I claim:

1. A heat exchange conductor comprising a pipe, a plurality of channel shaped fin members extending longitudinally of the pipe with their base or web portions engaging the outer surface of the pipe, each of said channel members being united to the pipe by a series of substantially evenly spaced spot welds of a combined area at least substantially equal to the combined longitudinal cross sectional area of the two flanges of the channel, and the total perimetric length of said welds being at least substantially equal to twice the length of the channel member.

2. A heat exchange conductor comprising a pipe, a fin member secured to the outer surface of the pipe, said fin member comprising a base portion and at least one flange portion formed integrally therewith and being united to the pipe by a series of substantially evenly spaced spot welds of a combined area at least substantially equal to the longitudinal cross-sectional area of the flange or flanges, and the total perimetric length of said welds being at least substantially equal to the total length of said flange or flanges.

JOHN W. BROWN, JR.